(12) United States Patent
Cheng et al.

(10) Patent No.: US 12,523,192 B2
(45) Date of Patent: Jan. 13, 2026

(54) FUEL FILTER ELEMENT

(71) Applicant: ZHEJIANG WEITAI AUTOMOBILE PARTS CO., LTD., Huzhou (CN)

(72) Inventors: Jianbin Cheng, Huzhou (CN); Yu Zhang, Huzhou (CN); Shixian Lan, Huzhou (CN); Qinglin Deng, Huzhou (CN); Xiaowei Ying, Huzhou (CN)

(73) Assignee: ZHEJIANG WEITAI AUTOMOBILE PARTS CO., LTD., Huzhou (CN)

( * ) Notice: Subject to any disclaimer, the term of this patent is extended or adjusted under 35 U.S.C. 154(b) by 457 days.

(21) Appl. No.: 17/956,979

(22) Filed: Sep. 30, 2022

(65) Prior Publication Data
US 2024/0110537 A1   Apr. 4, 2024

(51) Int. Cl.
*F02M 37/34*   (2019.01)
*B01D 29/15*   (2006.01)

(52) U.S. Cl.
CPC ............. *F02M 37/34* (2019.01); *B01D 29/15* (2013.01); *B01D 2201/0415* (2013.01)

(58) Field of Classification Search
CPC ................... F02M 37/34; B01D 29/15; B01D 2201/0415; B01D 36/001

USPC ....... 210/483, 472, 436, 120, 180, 188, 218, 210/315, 338, 493.1, 493.2, 493.5
See application file for complete search history.

(56) References Cited

U.S. PATENT DOCUMENTS

| | | | |
|---|---|---|---|
| 2011/0062075 A1* | 3/2011 | Lucas .................. | B01D 36/001 210/337 |
| 2011/0168621 A1* | 7/2011 | Wieczorek ........... | B01D 36/003 210/487 |
| 2021/0252434 A1* | 8/2021 | Chen .................... | B01D 36/001 |

\* cited by examiner

*Primary Examiner* — Madeline Gonzalez
(74) *Attorney, Agent, or Firm* — Ladas & Parry LLP

(57) ABSTRACT

The present application relates to the field of fuel filter components of internal combustion engines, and discloses a fuel filter element, including a support tube, a filter medium, and an upper cover plate and a lower cover plate. The upper cover plate is provided with a first channel. The lower cover plate is provided with a second channel. An air duct is arranged between the upper cover plate and the lower cover plate. The air duct communicates with the first channel and the second channel, and the air duct is positioned on an outer side of the filter medium. The filter medium is arranged between the air duct and a fuel feeding position, such that the stability of a fuel supply pressure and an exhaust state of this fuel filter element is enhanced.

9 Claims, 4 Drawing Sheets

FUEL FILTER ELEMENT

FIELD OF TECHNOLOGY

The present application relates to the field of fuel filter components of internal combustion engines, in particular to a fuel filter element.

BACKGROUND

In general, a fuel filter element is widely used in the field of fuel filtration of internal combustion engines to filter out debris in fuel, and plays a very important role in filtration. In a fuel supply system of an internal combustion engine, gas is present during installation or the solubility of gas in fuel decreases under the influence of a negative pressure during operation to cause gas overflow or fuel vapor is produced under the influence of a high temperature, and the accumulation of gas will lead to unstable fuel supply, insufficient power output, or stalling of the internal combustion engine. As a result, a filter element in a filter of the fuel supply system needs to have an exhaust function.

In the prior art, an exhaust channel is usually arranged in the center of a filter element. Since the exhaust channel in the center is close to a fuel feeding position, the pulsating impact of a fuel feeding pressure directly acts on the exhaust channel, such that gas cannot be exhausted normally, and the hermetical connection between the exhaust channel and a fuel inlet will also be damaged due to pressure pulse fatigue to cause unstable fuel supply pressure and exhaust state. In addition, an existing filter element only roughly filters fuel in general, and filtered fuel often contains some impurities and needs to be further filtered, so there is a problem of relatively low filtration precision.

SUMMARY

In order to solve the technical problems of unstable fuel supply pressure, unstable exhaust state, and relatively low filtration precision in the prior art, the present application provides a fuel filter element. An air duct is arranged on an outer side of a filter medium, and the air duct communicates with a first channel and a second channel, such that the process that fuel enters the filter element is not easily affected, and the separation of gas in the fuel will not be affected, thereby improving the exhaust performance, and enhancing the stability of a fuel supply pressure and an exhaust state of this fuel filter element. A secondary filtering element is annularly arranged outside the filter medium, such that crudely filtered fuel can be further filtered in time, thereby improving the filtration precision and efficiency of this fuel filter element.

In order to achieve the above objective, the present application adopts the following technical solution:

A fuel filter element, including a support tube, a filter medium surrounding the support tube, and an upper cover plate and a lower cover plate positioned at two ends of the filter medium, where the upper cover plate is provided with a first channel, the lower cover plate is provided with a second channel, an air duct is arranged between the upper cover plate and the lower cover plate, the air duct communicates with the first channel and the second channel, and the air duct is positioned on an outer side of the filter medium. The air duct is arranged on the outer side of the filter medium, the air duct communicates with the first channel and the second channel, and the filter medium is arranged between the air duct and a fuel feeding position, such that a pulsating pressure of fuel feeding is buffered by the filter medium, and a pulsating pressure on an exhaust channel is reduced, thereby improving the sealing reliability of the exhaust channel. Meanwhile, after the pulsating pressure of fuel feeding is buffered, the separation and exhaust of gas in fuel are facilitated, and the stability of a fuel supply pressure and an exhaust state of this fuel filter element are enhanced.

Further, a secondary filtering element is annularly arranged outside the filter medium, and the secondary filtering element includes a porous support frame and a filtering layer, and the filtering layer is attached to an inner side of the porous support frame. The secondary filtering element is annularly arranged outside the filter medium, such that crudely filtered fuel can be further filtered in time, thereby improving the filtration precision and efficiency of this fuel filter element. The filtering layer is a filter screen or filter cloth, which improves the filtration precision of this fuel filter element. The porous support frame is configured to increase the strength of the filter element, and may effectively prevent the filter element from being deformed, twisted, and damaged by a high pressure of the fuel.

Further, a plurality of rings are arranged at intervals on an outer peripheral side of the porous support frame, a plurality of ribs are arranged at intervals between adjacent two of the rings, and the ribs are configured to increase the strength of the filter element; and the air duct is arranged between the filter medium and the filtering layer. The separation of the gas in the fuel will not affected, such that the exhaust performance of this fuel filter element is improved.

Further, the upper cover plate includes an upper cover outer plate and an upper cover inner plate, and the upper cover outer plate and the upper cover inner plate are hermetically connected and form the first channel. The hermetical connection is an adhesive connection, rubber vulcanization or ultrasonic welding, such that the stability of this fuel filter element is enhanced.

Further, the upper cover inner plate is provided with a first hollow bulge penetrating through the air duct, and the first channel communicates with the first hollow bulge. The exhaust stability of this fuel filter element is improved.

Further, the lower cover plate comprises a lower cover outer plate and a lower cover inner plate, and the lower cover outer plate and the lower cover inner plate are hermetically connected and form the second channel. The hermetical connection is an adhesive connection, rubber vulcanization or ultrasonic welding, such that the stability of this fuel filter element is enhanced.

Further, the lower cover inner plate is provided with a second hollow bulge penetrating through the air duct, and the second channel communicates with the second hollow bulge. The second channel communicates with the second hollow bulge, such that the seal performance of the exhaust channel of this fuel filter element is improved.

Further, the first channel communicates to a gas inlet end of the upper cover outer plate, and the second channel is provided with a gas outlet for a gas to flow back into a fuel tank. Gas is conveniently exhausted, such that the exhaust convenience of this fuel filter element is improved.

Further, the upper cover inner plate and the lower cover inner plate are hermetically connected to the air duct. The stability of this fuel filter element is improved.

Further, the filter medium is in a star-like divergent shape. A contact surface of filtration is added, such that the filtration efficiency of this fuel filter element is improved.

Compared with the prior art, the present application has the following advantages: the air duct is arranged on the outer side of the filter medium, the air duct communicates with the first channel and the second channel, and the filter medium is arranged between the air duct and the fuel feeding position, such that the pulsating pressure of fuel feeding is buffered by the filter medium, and the pulsating pressure on the exhaust channel is reduced, thereby improving the sealing reliability of the exhaust channel. Meanwhile, after the pulsating pressure of fuel feeding is buffered, the separation and exhaust of the gas in the fuel are facilitated, and the stability of the fuel supply pressure and the exhaust state of this fuel filter element are enhanced. The secondary filtering element is annularly arranged outside the filter medium, such that the crudely filtered fuel can be further filtered in time, thereby improving the filtration precision and efficiency of this fuel filter element. The porous support frame is configured to increase the strength of the filter element, and may effectively prevent the filter element from being deformed, twisted, and damaged by the high pressure of the fuel.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

Figure 1:
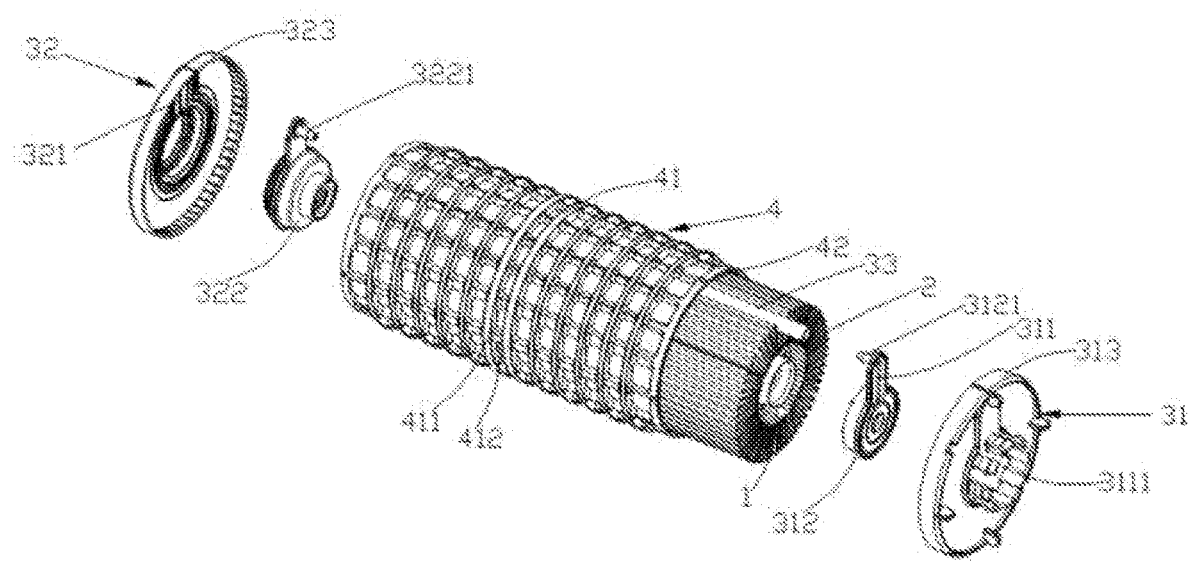
FIG. 1 is a three-dimensional assembly schematic diagram of an embodiment of a fuel filter element provided by the present application.

In the figures: 1: support tube; 2: filter medium; 31: upper cover plate; 311: first channel; 3111: gas inlet end; 312: upper cover inner plate; 3121: first hollow bulge; 313: upper cover outer plate; 32: lower cover plate; 321: second channel; 3211: gas outlet; 322: lower cover inner plate; 3221: second hollow bulge; 323: lower cover outer plate; 33: air duct; 4: secondary filtering element; 41: porous support frame; 411: ring; 412: rib; and 42: filtering layer.

DETAILED DESCRIPTION

The embodiments of the present application are described in detail below, and the examples of the embodiments are shown in the accompanying drawings. The embodiments described below with reference to the accompanying drawings are exemplary and intended to explain the present application, and should not be construed as a limitation to the present application.

In the description of the present application, it should be understood that the orientational or positional relationships indicated by the terms "center", "longitudinal", "transverse", "length", "width", "thickness", "upper", "lower", "front", "back", "left", "right", "vertical". "horizontal", "top". "bottom", "inside", "outside", etc. are based on the orientational or positional relationships shown in the accompanying drawings, are only used for the convenience of describing the present application and simplifying the description rather than indicating or implying that the referred device or element must have a specific orientation or be constructed and operated in a specific orientation, and therefore should not be construed as a limitation to the present application.

In addition, the terms "first" and "second" are only used for descriptive purposes, and should not be construed as indicating or implying relative importance or implying the number of indicated technical features. Thus, the features limited with "first" and "second" may explicitly or implicitly include at least one of the features. In the description of the present application, "a plurality of" means at least two, such as two, three, etc., unless otherwise expressly and specifically limited.

In the present application, the terms "installed", "connected", "connection", "fixed", etc. should be understood in a broad sense, unless otherwise expressly specified and limited. For example, it may be a fixed connection, a detachable connection, or integrated; it may be a mechanical connection, an electrical connection, or a mutual communication; and it may be directly connected, indirectly connected via an intermediate medium, an internal connection between two elements, or an interactive relationship between the two elements, unless otherwise expressly limited. Those of ordinary skill in the art may understand specific meanings of the above terms in the present application according to specific circumstances.

Referring to FIGS. 1 to 5 that show an embodiment of a fuel filter element in the present application, in this embodiment, the fuel filter element includes a support tube 1 and a filter medium 2. The above support tube 1 plays a supporting role in this fuel filter element. The above filter medium 2 is configured to filter fuel. The above filter medium 2 surrounds the above support tube 1. An upper cover plate 31 and a lower cover plate 32 are arranged at two ends of the above filter medium 2. The above upper cover plate 31 is provided with a first channel 311. The above lower cover plate 32 is provided with a second channel 321. An air duct 33 is arranged between the upper cover plate 31 and the lower cover plate 32. Two ends of the air duct 33 respectively communicate with the first channel 311 and the second channel 321 to form an exhaust channel for discharging fuel vapor. The above air duct 33 is positioned on an outer side of the above filter medium 2 to avoid affecting the process that the fuel enters the filter element, such that the separation of gas in the fuel is not easily affected. The filter medium 2 is arranged between the air duct 33 and a fuel feeding position, such that a pulsating pressure of fuel feeding is buffered by the filter medium 2, and a pulsating pressure on the exhaust channel is reduced, thereby improving the sealing reliability of the exhaust channel. Meanwhile, after the pulsating pressure of fuel feeding is buffered, the separation and exhaust of the gas in the fuel are facilitated.

In this embodiment, a secondary filtering element 4 is annularly arranged outside the above filter medium 2. The secondary filtering element 4 is configured to further filter the fuel. The secondary filtering element 4 includes a porous support frame 41 and a filtering layer 42. The porous support frame 41 is configured to increase the strength of the filter element, and may effectively prevent the filter element from being deformed, twisted, and damaged by a high pressure of the fuel. Specifically, the porous support frame 41 is formed with a plurality of filtering holes arranged in a matrix and configured to install a filter screen or other filter devices. The above filtering layer 42 is attached to an inner side of the above porous support frame 41. The above filtering layer 42 is the filter screen or filter cloth and is configured to further filter the fuel.

In this embodiment, at least two rings 411 are arranged at intervals on an outer peripheral side of the porous support frame 41, at least two ribs 412 are arranged at intervals between adjacent two of the above rings 411, and the above filtering holes are formed between adjacent two of the above rings 411 and adjacent two of the above ribs 412. The above ribs 412 are configured to increase the strength of the above filter element, and may effectively prevent the filter element from being deformed, twisted, and damaged by the high pressure of the fuel. The above air duct 33 is arranged between the above filter medium 2 and the above filtering layer 42.

In this embodiment, the above upper cover plate 31 includes an upper cover outer plate 313 and an upper cover inner plate 312, and the upper cover outer plate 313 and the upper cover inner plate 312 are hermetically connected and form the above first channel 311. In the prior art, the joint is usually sealed by means of a sealing ring. The relevant performance such as expansion strength and tear strength of the sealing ring is relatively weak and not enough to stabilize an air pressure state in the first channel 311. The above upper cover outer plate 313 and the above upper cover inner plate 312 are connected by an adhesive or a sealing element, can stabilize the air pressure state in the first channel 311, and are configured to stabilize an exhaust state in the first channel 311.

In this embodiment, the above upper cover inner plate 312 is provided with a first hollow bulge 3121 penetrating through the above air duct 33, a top end of the air duct 33 is sleeved on an outer peripheral side of a second hollow bulge 3221, and the above first channel 311 communicates with the above first hollow bulge 3121. The two ends of the above air duct 33 respectively communicate with the first channel and the second channel. The first hollow bulge 3121 is arranged to improve the air tightness of the air duct 33, thereby preventing the gas from leaking into the filter element, and preventing the fuel from leaking into the air duct 33.

In this embodiment, the above lower cover plate 32 includes a lower cover outer plate 323 and a lower cover inner plate 322, and the lower cover outer plate 323 and the lower cover inner plate 322 are hermetically connected and form the above second channel 321. In the prior art, the joint is usually sealed by means of the sealing ring. The relevant performance such as expansion strength and tear strength of the sealing ring is relatively weak and not enough to stabilize an air pressure state in the second channel 321. The above lower cover outer plate 323 and the above lower cover inner plate 322 are connected by an adhesive or a sealing element, can stabilize the air pressure state in the second channel 321, and are configured to stabilize an exhaust state in the second channel 321.

In this embodiment, the above lower cover inner plate 322 is provided with a second hollow bulge 3221 penetrating through the above air duct 33, a bottom end of the air duct 33 is sleeved on an outer peripheral side of the second hollow bulge 3221, and the above second channel 321 communicates with the above second hollow bulge 3221. The second hollow bulge 3221 is arranged to improve the air tightness of the air duct 33, thereby preventing the gas from leaking into the filter element, and preventing the fuel from leaking into the air duct 33.

In this embodiment, the above first channel 311 communicates to a gas inlet end 3111 of the above upper cover outer plate 313, and the above second channel 321 is provided with a gas outlet 3211 for a gas to flow back into a fuel tank. The gas inlet end 3111 or/and the gas outlet 3211 has/have a small hole diameter, can stabilize the air pressure state in the exhaust channel, and is/are configured to maintain a stable exhaust state and a certain fuel pressure.

In this embodiment, the above upper cover inner plate 312 and the above lower cover inner plate 322 are hermetically connected to the above air duct 33 and configured to form the sealed exhaust channel.

Figure 2:
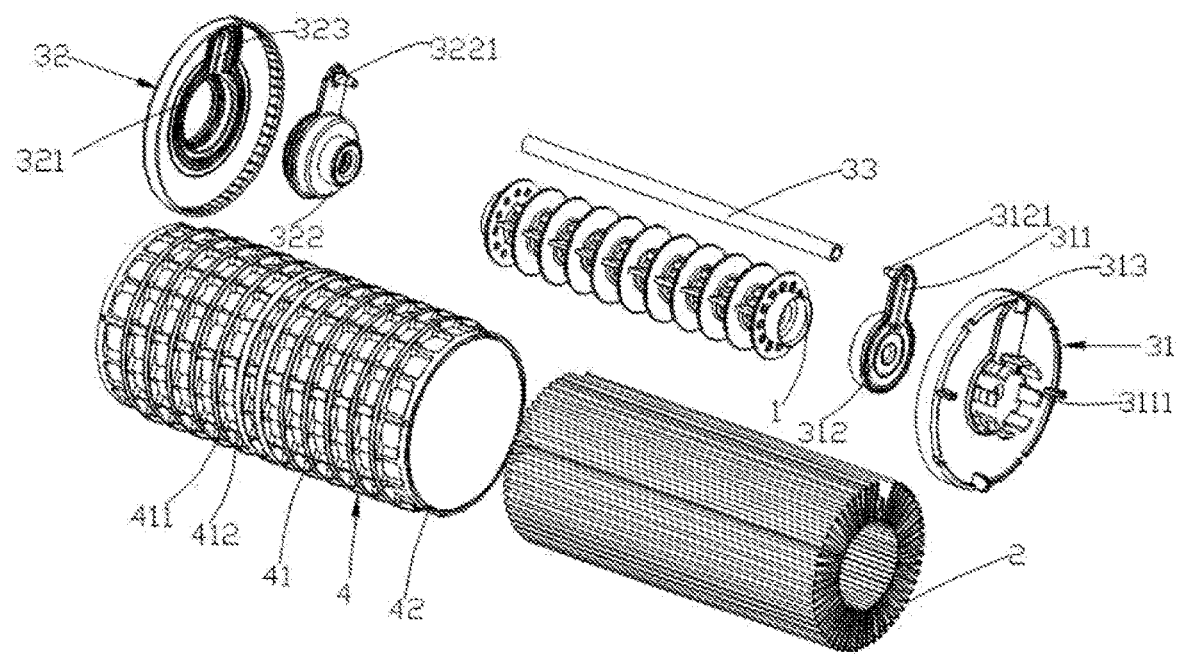
FIG. 2 is an exploded view of an embodiment of the fuel filter element provided by the present application.
Figure 3:
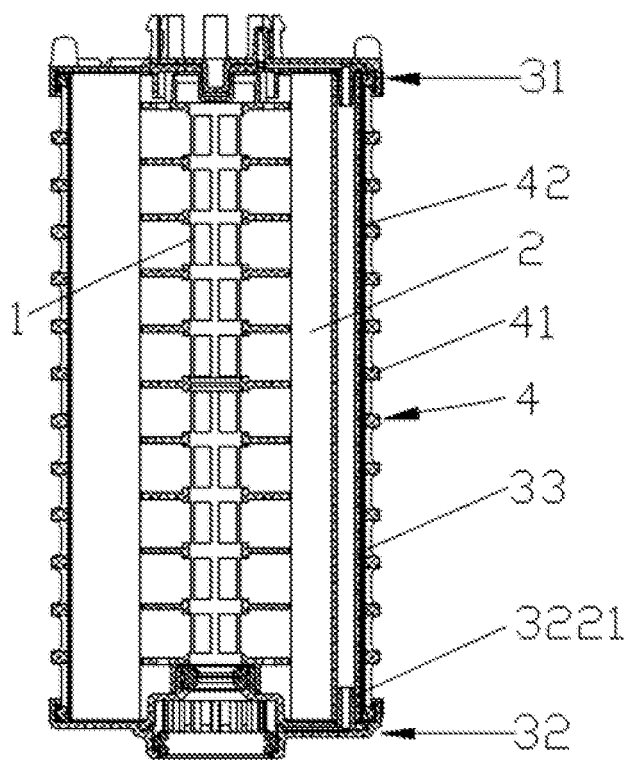
FIG. 3 is a cross-sectional view of an overall structure of an embodiment of the fuel filter element provided by the present application.
Figure 4:
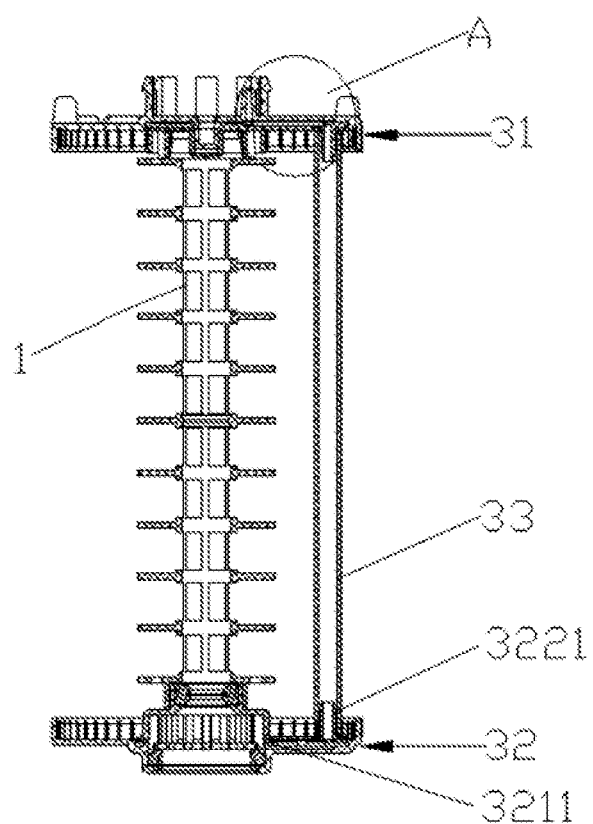
FIG. 4 is a cross-sectional view of an internal structure of an embodiment of the fuel filter element provided by the present application.
Figure 5:
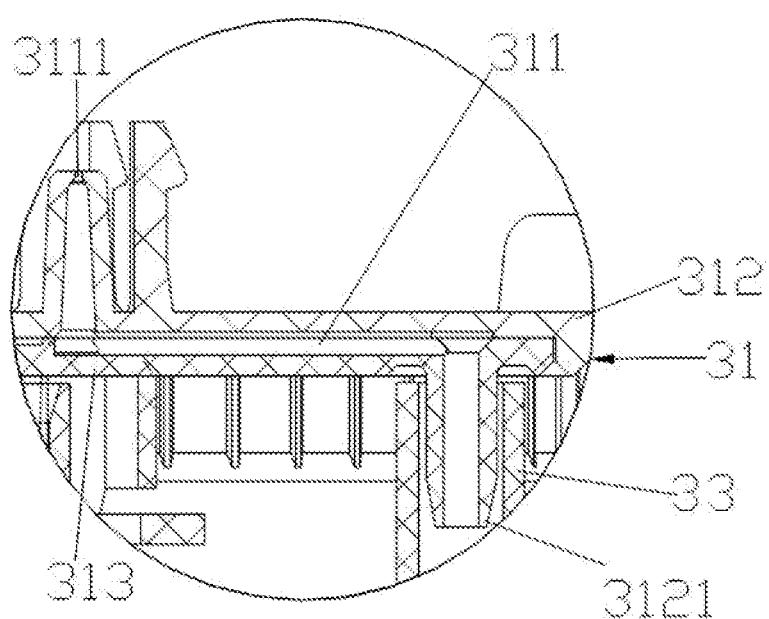
FIG. 5 is an enlarged view of A in FIG. 4 according to an embodiment of the fuel filter element provided by the present application.

Referring to FIG. 2, in this embodiment, the filter medium 2 is in a star-like divergent shape and is configured to increase the area of contact with the fuel that needs to be filtered. Correspondingly, the filter medium 2 may also be set to be of other cylindrical or columnar structures.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. A fuel filter element, comprising:
a support tube, a filter medium surrounding the support tube, and an upper cover plate and a lower cover plate positioned at two ends of the filter medium, respectively;
wherein the upper cover plate is provided with a first channel, the lower cover plate is provided with a second channel, an air duct is arranged between the upper cover plate and the lower cover plate, the air duct communicates with the first channel and the second channel, and the air duct is positioned on an outer side of the filter medium;
wherein the upper cover plate comprises an upper cover outer plate and an upper cover inner plate, the upper cover outer plate and the upper cover inner plate are hermetically connected and form the first channel, and the upper cover outer plate and the upper cover inner plate are connected by an adhesive or a sealing member,
wherein the lower cover plate comprises a lower cover outer plate and a lower cover inner plate, the lower cover outer plate and the lower cover inner plate are hermetically connected and form the second channel, and the lower cover outer plate and the lower cover inner plate are connected by an adhesive or a sealing member; and wherein the upper cover outer plate and the lower cover outer plate are hermetically connected to the two ends of the filter medium via an adhesive, the upper cover inner plate is arranged in the center of the upper cover outer plate, and the lower cover inner plate is arranged in the center of the lower cover outer plate.

2. The fuel filter element according to claim 1, wherein a secondary filtering element is annularly arranged outside the filter medium, and the secondary filtering element comprises a porous support frame and a filtering layer, and the filtering layer is attached to an inner side of the porous support frame.

3. The fuel filter element according to claim 2, wherein a plurality of rings are arranged at intervals on an outer peripheral side of the porous support frame, a plurality of ribs are arranged at intervals between adjacent two of the rings, and the ribs are configured to increase the strength of the filter element; and the air duct is arranged between the filter medium and the filtering layer.

4. The fuel filter element according to claim 1, wherein the upper cover inner plate is provided with a first hollow bulge portion penetrating through the air duct, and the first channel communicates with the first hollow bulge portion.

5. The fuel filter element according to claim 1, wherein the lower cover inner plate is provided with a second hollow bulge portion penetrating through the air duct, and the second channel communicates with the second hollow bulge portion.

6. The fuel filter element according to claim 4, wherein the first channel communicates to an air inlet end of the upper cover outer plate, and the second channel is provided with an air outlet for flowing back into a fuel tank.

7. The fuel filter element according to claim 6, wherein the upper cover inner plate and the lower cover inner plate are hermetically connected to the air duct.

8. The fuel filter element according to claim 5, wherein the first channel communicates to an air inlet end of the upper cover outer plate, and the second channel is provided with an air outlet for flowing back into a fuel tank.

9. The fuel filter element according to claim 1, wherein the filter medium is star-shaped and divergent.

* * * * *